(12) United States Patent
Mori et al.

(10) Patent No.: US 11,898,600 B2
(45) Date of Patent: Feb. 13, 2024

(54) TUBE FOR POWER TRANSMISSION SHAFT AND POWER TRANSMISSION SHAFT

(71) Applicant: Hitachi Astemo, Ltd., Ibaraki (JP)

(72) Inventors: Kenichi Mori, Ibaraki (JP); Takahiro Nakayama, Ibaraki (JP); Kazuki Ohta, Ibaraki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 365 days.

(21) Appl. No.: 17/185,282

(22) Filed: Feb. 25, 2021

(65) Prior Publication Data

US 2021/0180644 A1  Jun. 17, 2021

Related U.S. Application Data

(63) Continuation of application No. PCT/JP2019/010029, filed on Mar. 12, 2019.

(30) Foreign Application Priority Data

Feb. 27, 2019  (JP) .................................. 2019-033434

(51) Int. Cl.
*F16C 3/02*  (2006.01)

(52) U.S. Cl.
CPC .......... *F16C 3/026* (2013.01); *F16C 2326/06* (2013.01); *Y10S 138/11* (2013.01)

(58) Field of Classification Search
CPC ..... F16C 3/026; F16C 2326/06; Y10S 138/11
USPC ..................... 464/79, 80, 181, 183
See application file for complete search history.

(56) References Cited

U.S. PATENT DOCUMENTS

| | | | |
|---|---|---|---|
| 4,751,835 A * | 6/1988 | Galaniuk | F16C 3/02 |
| 5,553,964 A * | 9/1996 | Rouillot | F16C 3/026 |
| | | | 464/181 |
| 6,682,436 B2 * | 1/2004 | Kimoto | F16C 3/026 |
| | | | 464/181 |
| 9,624,964 B2 * | 4/2017 | Laskey | F16C 3/02 |
| 2003/0157988 A1 | 8/2003 | Nonogaki et al. | |

FOREIGN PATENT DOCUMENTS

| | | |
|---|---|---|
| JP | H03-265738 A | 11/1991 |
| JP | H04-316716 A | 11/1992 |
| JP | H05-87323 U | 11/1993 |
| JP | 2001-153126 A | 6/2001 |
| JP | 2003-237396 A | 8/2003 |

(Continued)

OTHER PUBLICATIONS

International Search Report and Written Opinion of the International Search Report for PCT/JP2019/010029 dated Jun. 4, 2019.

(Continued)

*Primary Examiner* — Greg Binda
(74) *Attorney, Agent, or Firm* — KENEALY VAIDYA LLP (57) ABSTRACT

A tube for a power transmission shaft is made of fiber-reinforced plastic, rotated to transmit power, and includes a main body in a shape of cylinder about an axis, wherein the main body has an outer diameter thereof gradually decreasing from a central portion thereof toward both ends thereof, and has a thickness thereof gradually decreasing from said both ends toward the central portion.

7 Claims, 6 Drawing Sheets

(56) References Cited

FOREIGN PATENT DOCUMENTS

SU      1109547 A  *  8/1984  .................... 464/80
WO  2017/168589 A1     10/2017
WO  2020/174692 A1      9/2020

OTHER PUBLICATIONS

Japanese Office Action (Decision to Refusal) for the related Japanese Patent Application No. 2019-033434 dated May 23, 2019.

* cited by examiner

TUBE FOR POWER TRANSMISSION SHAFT AND POWER TRANSMISSION SHAFT

CROSS-REFERENCE TO RELATED APPLICATION

This application is a PCT Bypass Continuation application of and claims the priority benefit under 35 U.S.C. § 120 to PCT application No. PCT/JP2019/010029, filed on Mar. 12, 2019 and therefore also claims the priority benefit under 35 U.S.C. § 119 of Japanese Patent Application No. 2019-033434 filed on Feb. 27, 2019, the disclosures of all of which (both the PCT application No. PCT/JP2019/010029 and Japanese Patent Application No. 2019-033434) are hereby incorporated in their entireties by reference.

TECHNICAL FIELD

The present invention relates to a tube for a power transmission shaft and a power transmission shaft.

BACKGROUND OF THE INVENTION

A power transmission shaft (propeller shaft) mounted in a vehicle includes a tube extending in a front-rear direction of the vehicle, and transmits the power generated by an engine and decelerated by a transmission to a final reduction gear by means of the tube. A tube for such a power transmission shaft includes one made of fiber-reinforced plastic. A tube made of fiber-reinforced plastic disclosed in Japanese Patent Application Publication No. H03-265738, for example, is in a cylindrical shape, to have a constant outer diameter end-to-end in a longitudinal direction of the tube, so that a middle portion of the tube has the same outer diameter as an end portion of the tube.

SUMMARY OF THE INVENTION

Problems to be Solved

Incidentally, the tube made of fiber-reinforced plastic has improved bending rigidity in order to improve the primary bending resonance point. For this reason, the outer diameter of the tube has been increased to have the tube increased in weight.

The present invention has been made to solve these problems and is intended to provide a tube for a power transmission shaft and a power transmission shaft, which are reduced in weight.

Solution to Problems

A tube for a power transmission shaft according to a first aspect of the present invention, for solving the aforementioned problems, is made of fiber-reinforced plastic, rotated to transmit power, and includes a main body in a shape of cylinder about an axis, wherein the main body has an outer diameter thereof gradually decreasing from a central portion thereof toward both ends thereof, and has a thickness thereof gradually decreasing from said both ends toward the central portion.

A tube for a power transmission shaft according to a second aspect of the present invention, for solving the aforementioned problems, is made of fiber-reinforced plastic, rotated to transmit power, and includes a main body in a shape of cylinder about an axis, wherein the main body has an outer diameter thereof formed to have the same diameter from one end thereof to a central portion thereof and gradually decreasing from the central portion toward the other end thereof, and has a thickness thereof gradually decreasing from said the other end toward the central portion and uniformly formed from the central portion to said one end.

Advantageous Effects of the Invention

According to the present invention, the central portion of the main body, where bending stresses are likely concentrated, has a larger outer diameter to secure predetermined bending rigidity. In contrast, both ends (or the other end) of the main body, where bending stresses are less likely concentrated, have a smaller outer diameter to have a reduced weight. In addition, the central portion of the main body is reduced in thickness to have a reduced weight. Accordingly, the entire main body is reduced in weight. Additionally, an amount of material required for manufacturing is reduced to have a reduced cost.

EMBODIMENTS OF THE INVENTION

Next, power transmission shafts having tubes of respective embodiments are described with reference to the drawings. Note that the embodiments each describe a case where the power transmission shaft of the present invention is applied to a propeller shaft installed in a front-engine, front-drive (FF) based four-wheel drive vehicle. Technical elements common to the embodiments are denoted by common reference numerals and duplicate descriptions are avoided.

First Embodiment

Figure 1:
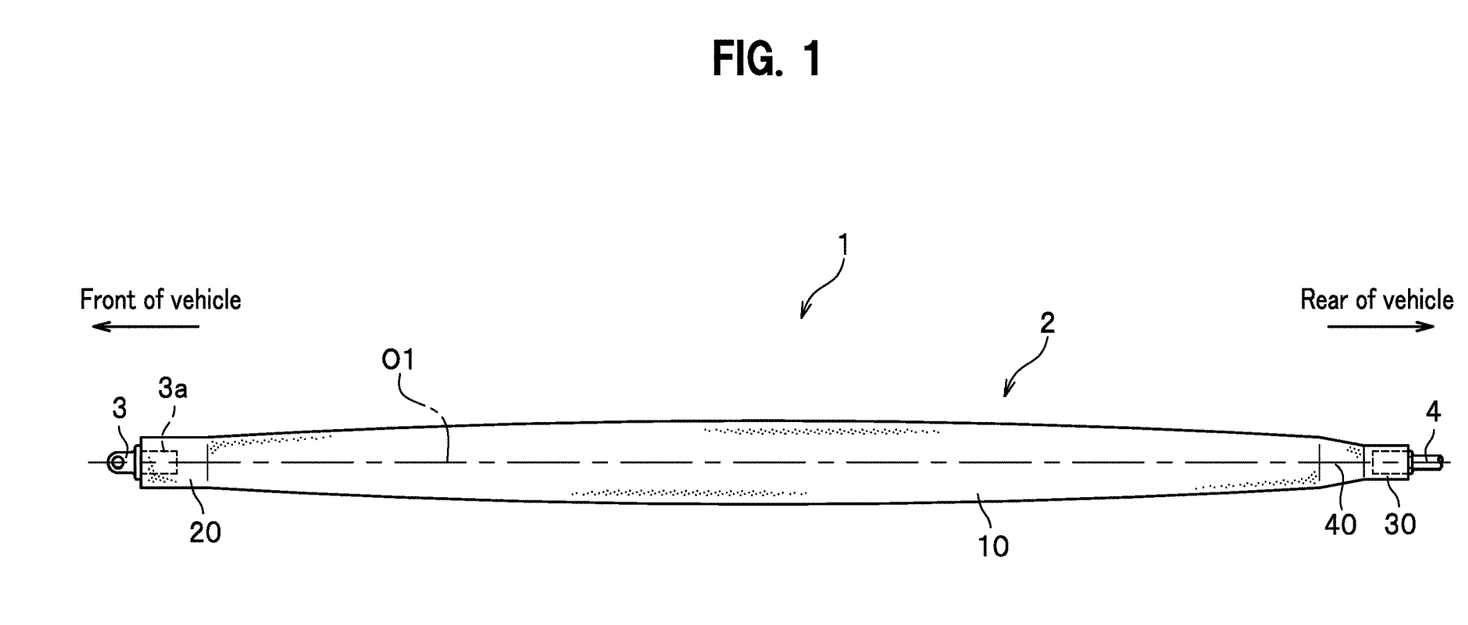
FIG. 1 is a side view of a tube for a power transmission shaft of a first embodiment.

As shown in FIG. 1, a power transmission shaft 1 includes a tube 2 in a substantially cylindrical shape extending in a front-rear direction of a vehicle, a stub yoke 3 of a cardan joint joined to a front end of the tube 2, and a stub shaft 4 of a constant velocity joint joined to a rear end of the tube 2. The stub yoke 3 is a coupling member to couple a transmission mounted at a front of a vehicle body with the tube 2. The stub shaft 4 is a coupling member to couple a final reduction gear mounted at a rear of the vehicle body with the tube 2. When power (torque) is transmitted from the transmission, the power transmission shaft 1 rotates about an axis O1 and transmits the power to the final reduction gear.

The tube 2 is formed of carbon fiber reinforced plastic (CFRP). Note that the fibers used in the fiber-reinforced plastic are not limited to carbon fibers in the present invention, and may be glass fibers or aramid fibers.

A method of manufacturing the tube 2 includes wrapping a continuous carbon fiber around a mandrel, which is not shown, to form a first molded body, and then wrapping a prepreg (a sheet of carbon fibers impregnated with a resin) around a periphery of the first molded body. Therefore, the tube 2 is manufactured using two techniques, a filament winding technique and a sheet winding technique. Here, the first molded body produced by the filament winding technique has high mechanical strength (especially torsional strength) because the continuity of a fiber (carbon fiber) is maintained. In contrast, the sheet winding technique allows the carbon fibers to be arranged so as to extend in an axial direction of the mandrel, to produce a second molded body with high elasticity along the axis O1. In other words, according to the above-described manufacturing method, a fiber layer formed of fibers wound about the axis O1 and a fiber layer formed of fibers extending along the axis O1 are stacked inside the tube 2, to allow for manufacturing the tube 2 having high mechanical strength and high elasticity along the axis O1. Note that a PAN (Polyacrylonitrile) fiber is preferred as a fiber oriented in the circumferential direction, and pitch fibers are preferred as fibers oriented along the axis O1.

The present invention is not limited to the above-mentioned manufacturing method. The tube 2 of the present invention may be manufactured by wrapping a prepreg around a mandrel to form a first molded body, and then wrapping a continuous carbon fiber around a periphery of the first molded body. Alternatively, the power transmission shaft of the present invention may be manufactured by a single manufacturing technique (filament winding technique or sheet winding technique).

The tube 2 includes a main body 10 to make up the majority of the tube 2, a first connection portion 20 disposed at a front of the main body 10, a second connection portion 30 disposed at a rear of the main body 10, and an inclined portion 40 located between the main body 10 and the second connection portion 30.

Figure 2:
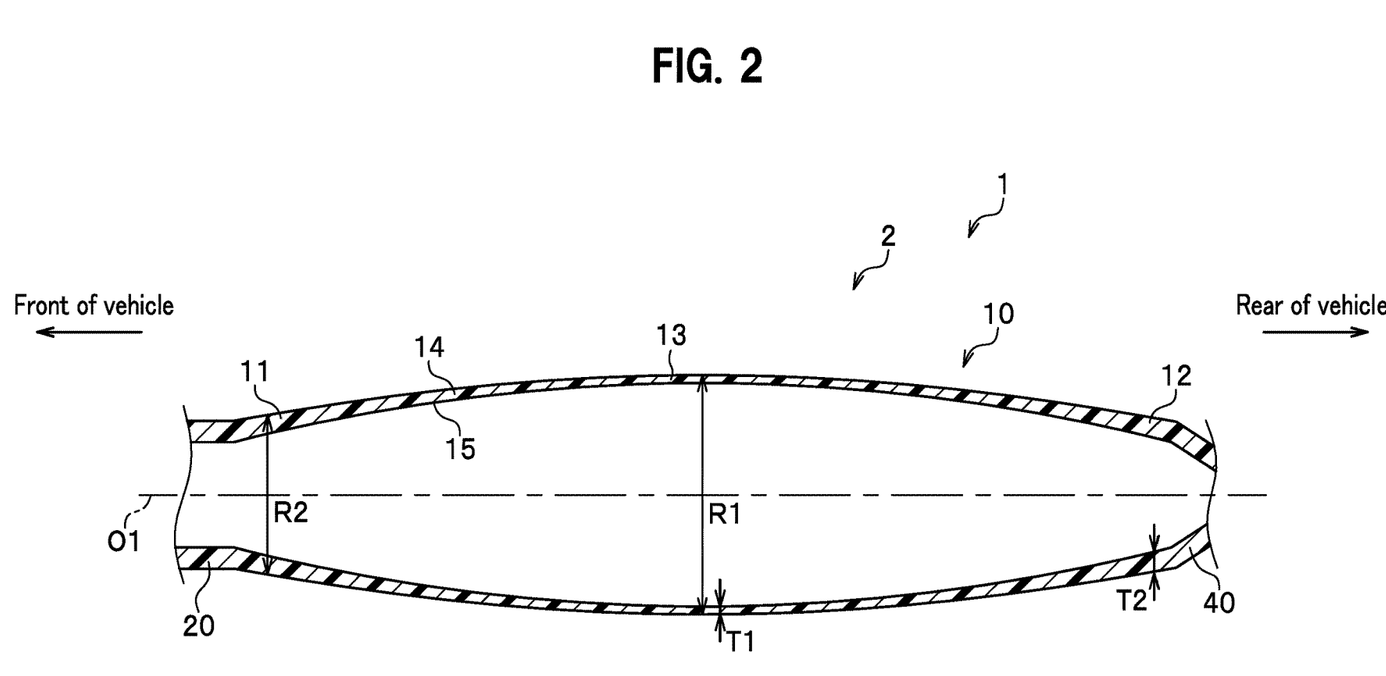
FIG. 2 is a cross-sectional view of a main body of the tube of the first embodiment, taken along an axial direction thereof.

FIG. 2 shows only the main body 10 of the tube 2, with exaggeration on features of the main body 10 for the purpose of illustrating the shape of the main body 10. As shown in FIG. 2, the first connection portion 20 continues to a front end 11 of the main body 10, and the inclined portion 40 continues to a rear end 12 of the main body 10.

When the main body 10 is sectioned in a plane normal to the axis O1, an outer periphery 14 and an inner periphery 15 of the main body 10 each have a cross section in a circular shape. The outer diameter of the main body 10 decreases from a central portion 13 toward both ends (the front and rear ends 11, 12), and an outer diameter R1 of the central portion 13 is larger than outer diameters R2 of said both ends (the front and rear ends 11, 12). Similarly, an inner diameter of the main body 10 also decreases from the central portion 13 of the main body 10 toward both ends (the front and rear ends 11, 12).

When the main body 10 is sectioned along the axis O1, the outer periphery 14 and inner periphery 15 of the main body 10 each have a cross section gently curved and protruding outward in an arc. Accordingly, the outer shape of the main body 10 has a barrel shape, with the central portion 13 bulging radially outward. With respect to the cross-sectional shapes, the curvature of the inner periphery 15 is greater than that of the outer periphery 14. In other words, a plate thickness of the main body 10 decreases from both ends (the front and rear ends 11, 12) toward the central portion 13, and a plate thickness T1 of the central portion 13 is smaller than a plate thickness T2 of said both ends (the front and rear ends 11, 12).

As shown in FIG. 1, a shaft portion 3a of the stub yoke 3 is fitted into the first connection portion 20. The outer periphery of the shaft portion 3a is formed in a polygonal shape. The first connection portion 20 has an inner periphery thereof formed in a polygonal shape, to follow the outer periphery of the shaft portion 3a. This configuration prevents the stub yoke 3 and the tube 2 from rotating relative to each other.

Figure 3:
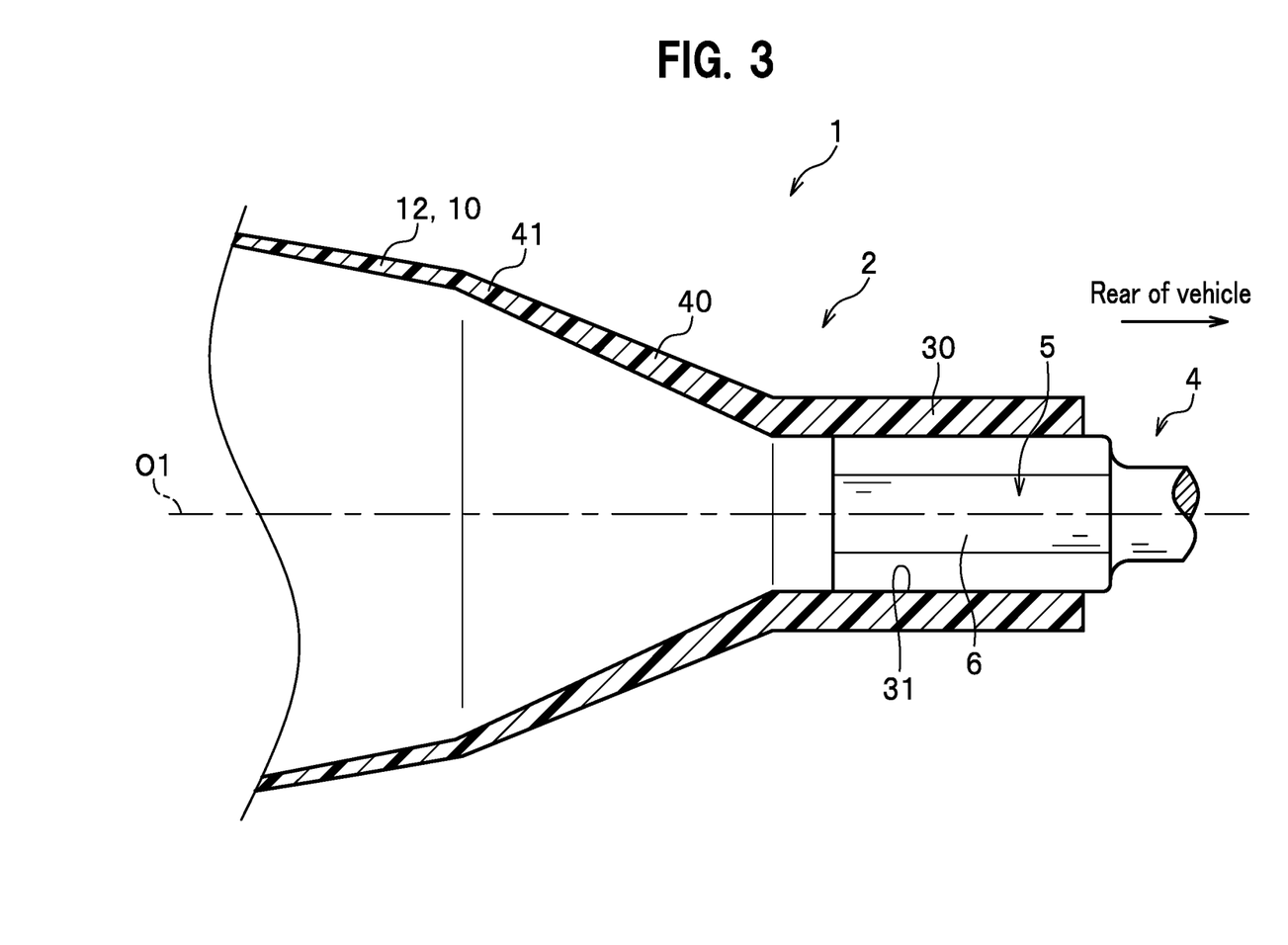
FIG. 3 is a cross-sectional view of an inclined portion and a second connection portion of the tube of the first embodiment, taken along the axial direction.

As shown in FIG. 3, a shaft portion 5 of the stub shaft 4 is fitted into the second connection portion 30. The shaft portion 5 of the stub shaft 4 has an outer periphery 6 thereof formed in a polygonal shape. The second connection portion 30 has an inner periphery 31 thereof formed in a polygonal shape, to follow the outer periphery 6 of the shaft portion 5 of the stub shaft 4. This configuration prevents the tube 2 and the stub shaft 4 from rotating relative to each other. In addition, the outer diameter of the second connection portion 30 is smaller than that of the rear end 12 of the main body 10. Note that reduction of the second connection portion 30 in diameter leads to reduction in torsional strength. Therefore, the plate thickness of the second connection portion 30 of the present embodiment is formed larger than that of the rear end 12 of the main body 10, to have a predetermined torsional strength.

The inclined portion 40 is a cylindrical portion formed between the main body 10 and the second connection portion 30. The inclined portion 40 has the outer diameter thereof gradually decreasing from the main body 10 toward the first connection portion 20, to have a truncated cone shape. The inclined portion 40 has the plate thickness thereof gradually decreasing from an end thereof closer to the second connection portion 30 (rear side) towards an end thereof closer to the main body 10 (front side). This causes the inclined portion 40 to have the smallest plate thickness at a front end 41 thereof as a vulnerable portion.

According to the above-described tube 2 for the power transmission shaft 1, the central portion 13 of the main body 10, where bending stress is likely concentrated, has the outer diameter R1 increased to have predetermined bending rigidity. In contrast, both ends of the main body 10 (the front and rear ends 11, 12), where bending stresses are less likely concentrated, have the outer diameter R2 decreased so as to be reduced in weight. Then, the main body 10 is reduced in weight while maintaining predetermined bending rigidity at the central portion 13, to improve the primary bending resonance point of the main body 10.

In addition, as the bending stress to act on the main body 10 of the tube 2 varies (decreases) from the central portion 13 toward both ends (the front and rear ends 11, 12), in an arc (in a curve), the outer shape of the tube 2 of the present embodiment is formed in an arc shape so as to be reduced in size in proportion to a rate of change. Thus, the main body 10 is reduced in weight, while having predetermined bending rigidity not only at the central portion 13 and both ends (the front and rear ends 11, 12), but also at intermediate portions between the central portion 13 and both ends. In short, the main body 10 of the tube 2 is reduced in weight to an extreme degree, while having the predetermined bending rigidity required for the respective portions, to greatly improve the primary bending resonance point of the main body 10.

Further, the main body 10 of the tube 2 has the plate thickness thereof increasing from the central portion 13 toward both ends (the front and rear ends 11, 12) in proportion to the rate of change in outer diameter (rate of reduction in diameter), in order to accommodate torsional stress. This ensures a predetermined strength corresponding to the torsional stresses acting uniformly on every portion of the main body 10. In short, the main body 10 of the tube 2 has strength corresponding to the predetermined bending and torsional stresses.

Still further, both ends of the tube 2 (the first and second connection portions 20, 30) need to be reduced in size and have the strength so as to be coupled with metal parts (the stub yoke 3 and stub shaft 4). According to the tube 2 of the present embodiment, although the central portion 13 has a large diameter, the first connection portion 20 and the second connection portion 30 are reduced in diameter and increased in plate thickness, to satisfy the requirements of being reduced in size and ensuring strength.

Still further, the central portion 13 is reduced in thickness and both ends (the front and rear ends 11, 12) are reduced in diameter, to have an amount of material required for manufacturing the tube 2 reduced. Then, costs may be reduced. Additionally, the tube 2 is formed of fiber-reinforced plastic, to have a high degree of freedom in design, and then costs may further be reduced.

Still further, according to the tube 2 as described above, if a vehicle is collided from up ahead to have a collision load inputted to the tube 2, a shear force acts on the inclined portion 40, which is inclined with respect to the axis O1. If the shear force acting on the inclined portion 40 exceeds a predetermined value, damaged is the front end (vulnerable portion) 41 which is the most vulnerable in the inclined portion 40. This allows the engine and transmission mounted on the front of the vehicle body to be quickly moved rearward, in the event of a vehicle collision, to absorb the collision energy by the front of the vehicle body.

Second Embodiment

Figure 4:
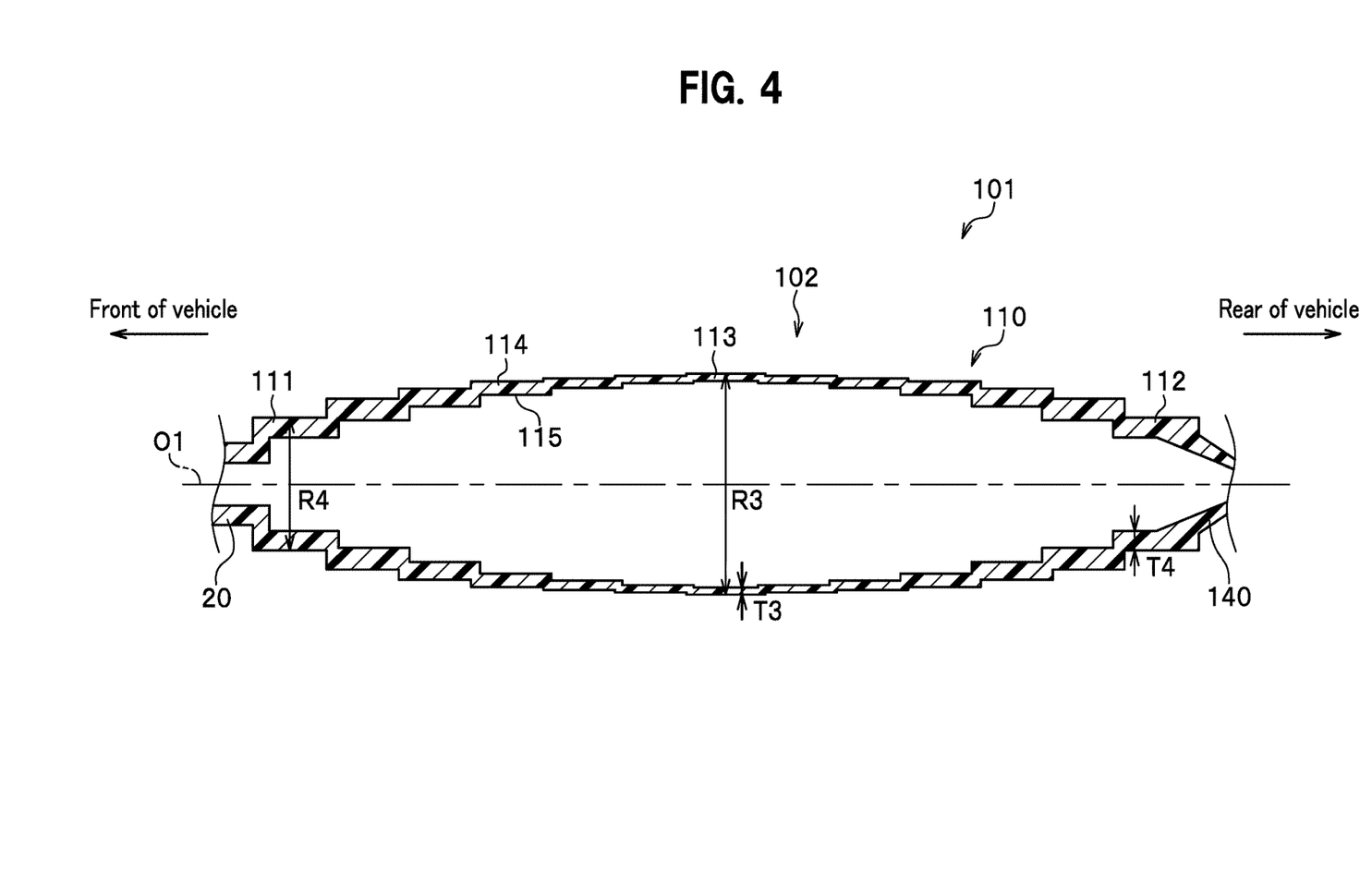
FIG. 4 is a cross-sectional view of a main body of a tube of a second embodiment, taken along an axial direction thereof.

Next, a power transmission shaft 101 of a second embodiment is described with reference to FIG. 4. Note that FIG. 4 shows it, with exaggeration on features of a main body 110. The power transmission shaft 101 of the second embodiment includes a tube 102, the stub yoke 3 (see FIG. 1) to be joined to a front end of the tube 102, and the stub shaft 4 (see FIG. 1) to be joined to a rear end of the tube 102. As shown in FIG. 4, the tube 102 includes the main body 110, the first connection portion 20 disposed in front of the main body 110, the second connection portion 30 disposed behind the main body 110 (not shown in FIG. 4), and an inclined portion 140 located between the main body 110 and the second connection portion 30.

When the main body 110 is sectioned in a plane normal to the axis O1, an outer periphery 114 and an inner periphery 115 of the main body 110 each have a cross section in a circular shape. The outer diameter of the main body 110 decreases from a central portion 113 toward both ends (a front end 111 and a rear end 112), and an outer diameter R3 of the central portion 113 is larger than an outer diameter R4 of said both ends (the front and rear ends 111, 112). Similarly, an inner diameter of the main body 110 also decreases from the central portion 113 of the main body 110 toward both ends (the front and rear ends 111, 112).

When the main body 110 is sectioned along the axis O1, the outer periphery 114 and inner periphery 115 of the main body 110 each have a cross section in a stepped shape. A plate thickness of the main body 110 decreases from both ends (the front and rear ends 111, 112) toward the central portion 113. Thus, a plate thickness T3 of the central portion 113 is smaller than a plate thickness T4 of both ends (the front and rear ends 111, 112).

Although not particularly shown, the plate thickness of the inclined portion 140 gradually decreases from an end thereof closer to the main body 110 (front side) toward an end thereof closer to the second connection portion 30 (rear side). This causes the inclined portion 140 to have the smallest plate thickness at the rear end thereof, making the rear end of the inclined portion 140 as a vulnerable portion. Accordingly, if the vehicle is collided from up ahead and a shear force acting on the inclined portion 140 exceeds a predetermined value, damaged is the rear end (the vulnerable portion) which is the most vulnerable in the inclined portion 140.

According to the tube 102 for the power transmission shaft 101 of the second embodiment, the main body 110 is reduced in weight and the primary bending resonance point of the main body 110 is improved, as with the tube 2 of the first embodiment. In addition, both ends (the front and rear ends 111, 112) are reduced in diameter and the central portion 113 is reduced in thickness, to have an amount of material required for manufacturing reduced, and then costs may be reduced.

Third Embodiment

Figure 5:
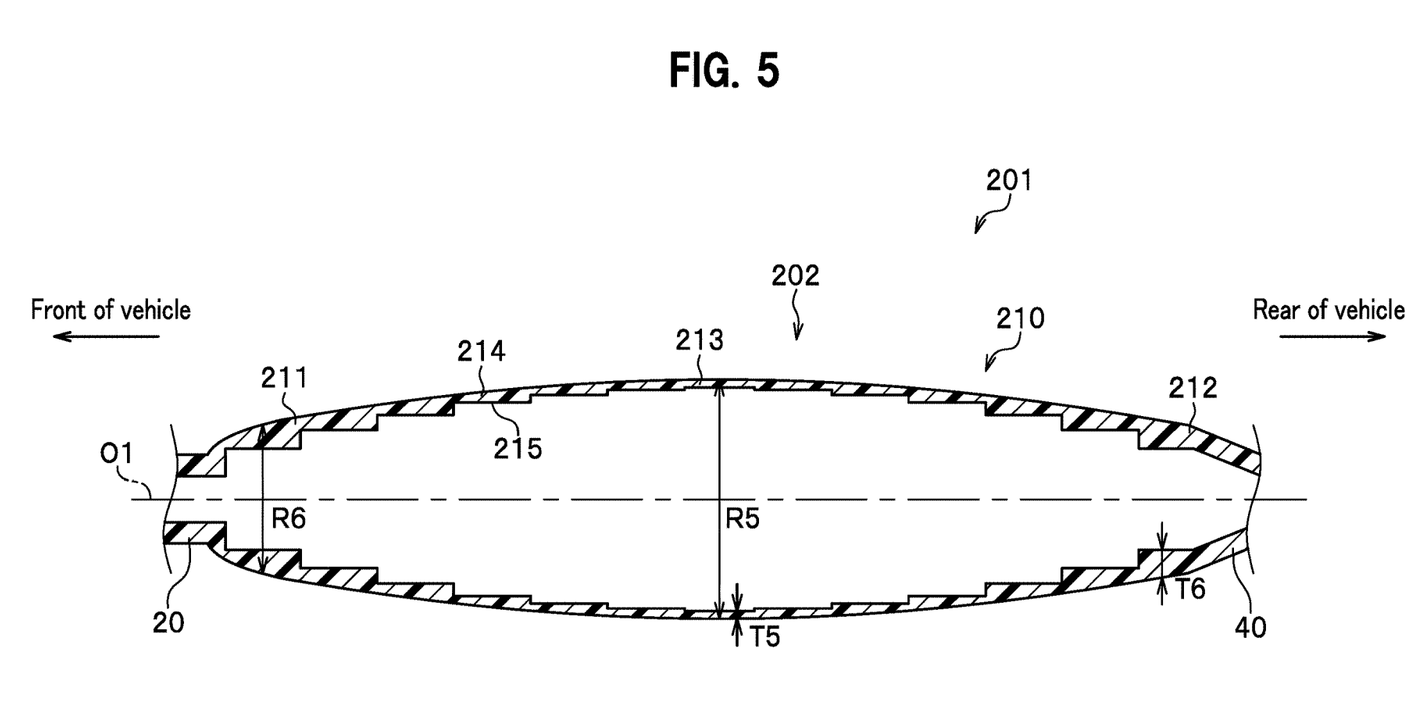
FIG. 5 is a cross-sectional view of a main body of a tube of a third embodiment, taken along an axial direction thereof.

Next, a power transmission shaft 201 of a third embodiment is described with reference to FIG. 5. Note that FIG. 5 shows it, with exaggeration on features of a main body 210. The power transmission shaft 201 of the third embodiment includes a tube 202, the stub yoke 3 (see FIG. 1) to be joined to a front end of the tube 202, and the stub shaft 4 (see FIG. 1) to be joined to a rear end of the tube 202. As shown in FIG. 5, the tube 202 includes the main body 210, the first connection portion 20 disposed in front of the main body 210, the second connection portion 30 (not shown in FIG. 5) disposed behind the main body 210, and the inclined portion 40 located between the main body 210 and the second connection portion 30.

When the main body 210 is sectioned in a plane normal to the axis O1, an outer periphery 214 and an inner periphery 215 of the main body 210 each have a cross section in a circular shape. The outer diameter of the main body 210 decreases from a central portion 213 toward both ends (a front end 211 and a rear end 212), and an outer diameter R5 of the central portion 213 is larger than an outer diameter R6 of said both ends (the front end 211 and rear end 212). Similarly, an inner diameter of the main body 210 also decreases from the central portion 213 toward both ends (the front and rear ends 211, 212).

When the main body 210 is sectioned along the axis O1, the outer periphery 214 of the main body 210 has a cross section in an arc and the inner periphery 215 has a cross section in a stepped shape. A plate thickness of the main body 210 decreases from both ends (the front and rear ends 211, 212) toward the central portion 13, and thus a plate thickness T5 of the central portion 213 is smaller than a plate thickness T6 of said both ends (the front end 211 and rear end 212).

According to the tube 202 for the power transmission shaft 201 of the third embodiment, the main body 210 is reduced in weight and the primary bending resonance point of the main body 210 is improved, as with the tube 2 of the first embodiment. In addition, both ends (the front and rear ends 211, 212) are reduced in diameter and the central portion 213 is reduced in thickness, to have an amount of material required for manufacturing reduced, and then costs may be reduced. Further, the tube 202 is formed of fiber-reinforced plastic, to have a high degree of freedom in design, and then costs may be reduced.

Fourth Embodiment

Figure 6:
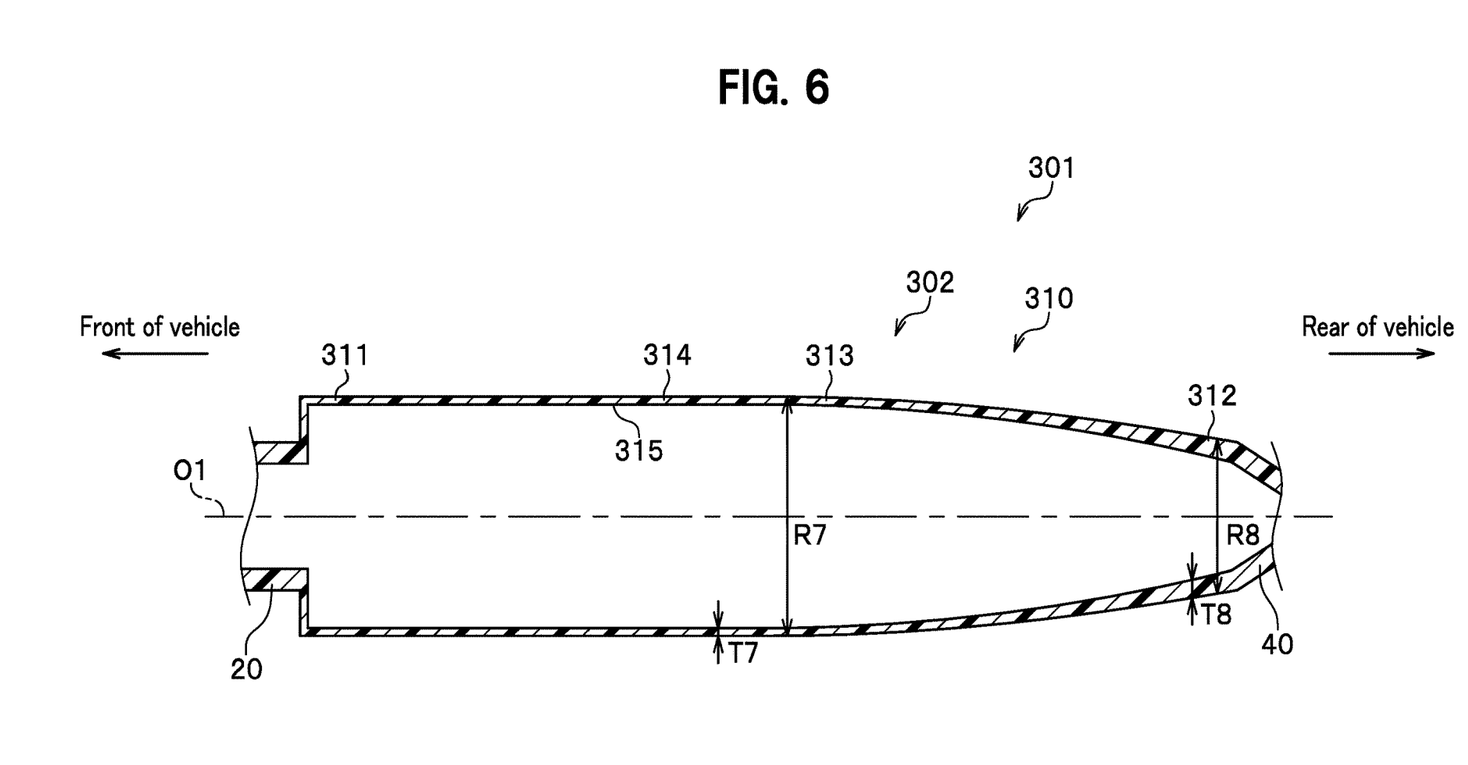
FIG. 6 is a cross-sectional view of a main body of a tube of a fourth embodiment, taken along an axial direction thereof.

A power transmission shaft 301 of a fourth embodiment includes a tube 302, the stub yoke 3 (see FIG. 1) to be joined to a front end of the tube 302, and the stub shaft 4 (see FIG. 1) to be joined to a rear end of the tube 302. As shown in FIG. 6, the tube 302 includes a main body 310, the first connection portion 20 disposed in front of the main body 310, the second connection portion 30 disposed behind the main body 310 (not shown in FIG. 6), and then inclined portion 40 located between the main body 310 and the second connection portion 30.

When the main body 310 is sectioned in a plane normal to the axis O1, an outer periphery 314 and an inner periphery 315 of the main body 310 each have a cross section in a circular shape. The outer diameter of the main body 310 is identically formed from a front end 311 to a central portion 313, and decreases from the central portion 313 toward a rear end 312. Thus, an outer diameter R7 of the front end 311 and central portion 313 is larger than an outer diameter R8 of the rear end 312. Similarly, the inner diameter of the main body 310 is identically formed from the front end 311 to center portion 313 of the main body 310, and decreases from the center portion 313 toward the rear end 312.

When the main body 310 is sectioned along the axis O1, the outer periphery 314 and inner periphery 315 of the main body 310 each have a cross section in a shape of a straight line from the front end 311 to the central portion 313, and a cross section in a shape of a gentle curve in an arc from the central portion 313 to the rear end 312. In addition, the plate thickness of the main body 310 decreases from the rear end 312 toward the central portion 313 and is uniformly formed from the central portion 313 to the front end 311. Thus, a plate thickness T7 of the front end 311 and central portion 313 is smaller than a plate thickness T8 of the rear end 312.

According to the tube 302 for the power transmission shaft 301 of the fourth embodiment, the central portion 313 of the main body 310 is formed to have the large outer diameter R7 to ensure predetermined bending rigidity. The rear end 312 of the main body 310 is formed to have the small outer diameter R8 to reduce weight. In addition, the central portion 313 of the main body 310 has the small plate thickness T7 to reduce weight. Thus, the main body 310 is reduced in weight while maintaining predetermined bending rigidity of the central portion 313, to improve the primary bending resonance point of the main body 310. Further, the rear end 312 is reduced in diameter and the central portion 313 is reduced in thickness, to have an amount of material required for manufacturing reduced, and then costs may be reduced. Furthermore, the tube 302 is formed of fiber-reinforced plastic, to have a high degree of freedom in design, and then costs may be reduced.

Hereinabove, the embodiments have been described, but the present invention is not limited to those described in the embodiments. For example, the tube of each embodiment is provided with connection portions (the first and second connection portions 20, 30) for coupling with the stub yoke 3 and the like, but the present invention may provide a tube having only a main body. In other words, a tube of the present invention may be composed of only a main body to have the stub yoke 3 and the like respectively fitted into both ends of the main body.

The inclined portion 40 of each embodiment gradually decreases in plate thickness to have an easily-damaged vulnerable portion at an end, but may have the plate thickness uniformly formed and have a recess provided in the outer or inner periphery as a vulnerable portion.

LEGEND FOR REFERENCE NUMERALS 1, 101, 201, 301: power transmission shaft; 2, 102, 202, 302: tube; 10, 110, 210, 310: main body; 11, 111, 211, 311: front end; 12, 112, 212, 312: rear end; 13, 113, 213, 313: central portion; 20: first connection portion; 30: second connection portion; 40: inclined portion; and O1: axis.

What is claimed is:

1. A tube for a power transmission shaft, made of fiber-reinforced plastic and rotated to transmit power, comprising:
a main body in a shape of cylinder about an axis;
a connection portion in a cylindrical shape to be joined to a coupling member; and
an inclined portion located between the main body and the connection portion and formed to have an outer diameter thereof decreasing from the main body toward the connection portion, the inclined portion continuing to the main body via a vulnerable portion,
wherein the main body has an outer diameter thereof gradually decreasing from a central portion thereof toward both ends thereof,
the main body has a thickness thereof gradually decreasing from said both ends toward the central portion,
the main body has an inner periphery formed in an arc shape along the axis, from one end of said both ends to the other end of said both ends, and
a plate thickness of the inclined portion decreases from the connection portion toward the main body.

2. The tube as claimed in claim 1 wherein
the main body has an outer periphery formed in an arc shape along the axis, from one end of said both ends to the other end of said both ends.

3. The tube as claimed in claim 2, wherein a plate thickness of the main body decreases from said both ends toward the central portion, with a curvature of the inner periphery made larger than that of the outer periphery.

4. The tube as claimed in claim 2, wherein
the fiber-reinforced plastic is carbon fiber reinforced plastic.

5. The tube as claimed in claim 1, wherein
the fiber-reinforced plastic is carbon fiber reinforced plastic.

6. The tube as claimed in claim 1, wherein
an inner periphery of the connection portion is formed in a polygonal shape.

7. A power transmission shaft comprising:
the tube as claimed in claim 1;
a stub yoke joined to a front end of the tube; and
a stub shaft joined to a rear end of the tube.

* * * * *

UNITED STATES PATENT AND TRADEMARK OFFICE
CERTIFICATE OF CORRECTION

PATENT NO. : 11,898,600 B2
APPLICATION NO. : 17/185282
DATED : February 13, 2024
INVENTOR(S) : Kenichi Mori et al.

It is certified that error appears in the above-identified patent and that said Letters Patent is hereby corrected as shown below:

On the Title Page

Item (73) Assignee, Please change "BROTHER KOGYO KABUSHIKI KAISHA, Nagoya (JP)" to –Hitachi Astemo, Ltd., Ibaraki (JP)–.

Signed and Sealed this
Twenty-sixth Day of March, 2024

Katherine Kelly Vidal
*Director of the United States Patent and Trademark Office*